US009161500B2

United States Patent
Hansen

(10) Patent No.: US 9,161,500 B2
(45) Date of Patent: Oct. 20, 2015

(54) SELF-WATERING SYSTEM FOR A POTTED PLANT

(76) Inventor: Jørn Hansen, Odense N (DK)

( * ) Notice: Subject to any disclaimer, the term of this patent is extended or adjusted under 35 U.S.C. 154(b) by 95 days.

(21) Appl. No.: 13/501,705

(22) PCT Filed: Oct. 19, 2010

(86) PCT No.: PCT/DK2010/050277
§ 371 (c)(1),
(2), (4) Date: Apr. 12, 2012

(87) PCT Pub. No.: WO2011/047687
PCT Pub. Date: Apr. 28, 2011

(65) Prior Publication Data
US 2012/0198767 A1 Aug. 9, 2012

(30) Foreign Application Priority Data

Oct. 20, 2009 (DK) .................................. 2009 01135
Feb. 8, 2010 (DK) .................................. 2010 00107

(51) Int. Cl.
*A01G 27/04* (2006.01)
*A01G 27/06* (2006.01)

(52) U.S. Cl.
CPC ................ *A01G 27/04* (2013.01); *A01G 27/06* (2013.01)

(58) Field of Classification Search
CPC ...... A01G 27/06; A01G 27/008; A01G 27/04
USPC ....................................... 47/79–81
See application file for complete search history.

(56) References Cited

U.S. PATENT DOCUMENTS

| 4,117,632 A | | 10/1978 | Pearce | |
| 4,864,771 A | * | 9/1989 | Fah | 47/79 |
| 4,885,869 A | * | 12/1989 | Kim | 47/79 |
| 4,932,159 A | | 6/1990 | Holtkamp, Sr. | |
| 4,937,974 A | * | 7/1990 | Costa et al. | 47/81 |
| 5,020,275 A | * | 6/1991 | Bednarzik | 47/79 |
| 5,174,062 A | * | 12/1992 | Kim | 47/81 |
| 5,193,305 A | * | 3/1993 | Holtkamp, Jr. | 47/81 |
| 5,352,253 A | | 10/1994 | Gritching | |
| 6,370,819 B1 | | 4/2002 | Reiss et al. | |
| 6,957,512 B2 | * | 10/2005 | Bakula et al. | 47/62 A |
| 7,513,611 B2 | * | 4/2009 | Manzone et al. | 347/85 |

(Continued)

FOREIGN PATENT DOCUMENTS

| FR | 2 637 156 | 4/1990 |
| GB | 2 418 340 A | 9/2004 |
| WO | WO 80/02359 | 11/1980 |

OTHER PUBLICATIONS

International Search Report (Form PCT/ISA/210) for corresponding International Application No. PCT/DK2010/050277.

*Primary Examiner* — Rob Swiatek
*Assistant Examiner* — Morgan T. Barlow
(74) *Attorney, Agent, or Firm* — Merchant & Gould P.C.

(57) ABSTRACT

The invention provides a self-watering system for a potted plant comprising a liquid container and an insert with an in use position against the potted plant pointing upper part (9), which extends at least partially through an opening in the pot (4) bottom. The invention is primarily intended for use in watering of potted plants ready for sale from e.g. horticultural greenhouses, but can obviously also be used for both the subsequent watering during the rest of the plant's life from end-users and for watering during the cultivation of a potted plant.

9 Claims, 10 Drawing Sheets

(56) References Cited

U.S. PATENT DOCUMENTS

| | | | |
|---|---|---|---|
| 2002/0017058 A1* | 2/2002 | Chung | 47/79 |
| 2004/0010970 A1 | 1/2004 | Baumann | |
| 2004/0216377 A1* | 11/2004 | Cox et al. | 47/81 |
| 2005/0252080 A1* | 11/2005 | Wright | 47/79 |
| 2006/0112634 A1* | 6/2006 | Vogt | 47/81 |
| 2011/0036006 A1* | 2/2011 | Griebel | 47/81 |

* cited by examiner

SELF-WATERING SYSTEM FOR A POTTED PLANT

This application is a National Stage Application of PCT/DK2010/050277, filed 19 Oct. 2010, which claims benefit of Serial No. PA 2010 00107, filed 8 Feb. 2010 in Denmark, and which also claims benefit of Serial No. PA 2009 01135, filed 20 Oct. 2009 in Denmark and which applications are incorporated herein by reference. To the extent appropriate, a claim of priority is made to each of the above disclosed applications.

FIELD OF THE INVENTION

The present invention relates to a self-watering system for a potted plant comprising a liquid container and an insert with an upper portion that extends at least partially through an opening in the pot bottom when it is placed in the system. The invention is primarily intended for use in irrigation of potted plants ready for sale by for example horticultural greenhouses, but can obviously also be used for both the subsequent irrigation during the rest of the plant's life from end-users and for irrigation during the cultivation of a potted plant.

BACKGROUND OF THE INVENTION

Often potted plants are transported in refrigerated trucks from the greenhouse to the supermarket, which can occur at as low as 3-4° C., where plant growth halt, and typically take 1-2 days. Afterwards the pot plants typically stand in the supermarket for up to approx. 4-6 days before they collapse. This applies, for example, to roses, which require special favorable living conditions, including efficient irrigation to keep them fresh.

There could easily lapse e.g. 10 days or longer from a potted plant finish growing until it ends at the end user's home, and during this period it is desirable that the plant is watered efficiently to avoid plant languish or even collapse. Supply of a sufficient amount of liquid during the whole period and the effective distribution of liquid volume to the plant roots are particularly desirable. Especially in supermarkets it may be difficult for busy staff to perform effective manual irrigation of the many different types of potted plants that have different water needs.

U.S. Pat. No. 5,352,253 discloses a process for even watering a plant in a flowerpot, which is located on a foot inside a container of water. Footer ensure that raise the pot above water level, while absorbent wicks ensure that lead water from the container to the plant. Wicks one end attached to the foot while the other end manually forced through special openings on the side of the pot using a suitable rod when the pot is placed on the foot. This will require a cumbersome manual operation to this famous watering system works.

U.S. Pat. No. 6,370,819 discloses a different system of self-watering pot plants. The flowerpot is supported by the mating surfaces at several evenly spaced pins or skewers, made of a material capable of transporting water from the water container. The legs extend from the bottom of a water container through a corresponding number of openings made in the pot bottom, into the soil in the pot, so as to provide even watering when the water container containing water.

In order for the pot to rest stably on its legs, it is necessary to have at least three evenly spaced legs extending from self-watering container bottom to the pot bottom. It is not easy to arrange all the holes in the pot bottom above the corresponding number of frail and thin upwardly directing legs. It is time consuming and if only one leg is broken at least the water container must be discarded and the entire placement procedure is repeated. U.S. Pat. No. 6,370,819 also describes the use of a single water wicking leg. The water wicking legs have a water wicking base on which the flowerpot base is resting directly. This embodiment allows the container to contain only a limited amount of water because the pot will otherwise be in direct contact with irrigation water. A potted plant used in this self-watering design could easily be over-watered resulting in constantly flooded roots that will rotten.

U.S. Pat. No. 4,117,632 discloses a self-watering system for potted plant, which comprises a liquid container, wherein an insert is provided with a wick for transporting liquid from the liquid container. The lower part of the insert is adapted to the liquid container so that the insert is centred therein. The wick extends along the upper part of the insert and is then guided into the insert about halfway down. In the embodiment shown in U.S. Pat. No. 4,117,632 the wick is wound around the upper part of the insert. This creates a long transport path from the liquid in the liquid container to the potted plant. Moreover it is difficult to draw the wick into the insert.

Hence, there exists a need for a new and improved self-watering system that can overcome the problems of the known self-watering systems. Because different types of plants and/or different types of growth media, potting soil, peat moss, peat or synthetic enriched growth media, such as rockwool added fertilizer, have different liquid needs and very different abilities to hold water, it is desirable to have a self-watering system that can accommodate these varying needs.

SUMMARY OF THE INVENTION

Within the scope of the present invention, the term "use position" means the position which the pot acquires when it receives water from the water container in which the pot sits.

Within the scope of the present invention, a potted plant "liquid needs" to mean the flow of liquid volume per unit time, the distribution of liquid in the pot plant growing medium and the total volume of liquid in the liquid container that meets the plant's growing conditions. A potted plant's liquid needs e.g. depend on plant type, growth medium, and how developed its roots are.

In a first aspect according to the present invention there is provided a self-watering system of the initially mentioned kind, which is easy to use and adaptable to different liquid needs of different plants.

In another aspect according to the present invention there is provided a self-watering system of the initially mentioned kind, which effectively distributes the liquid into the pot plant growing medium.

In a third aspect according to the present invention there is provided a self-watering system that ensures that the pot is stably supported.

Specifically for these aspects there is provided self-watering system (1) for a potted plant comprising a liquid container (2) and an insert (3) with an in use position against the potted plant pointing upper part (9), which extends at least partially through an opening in the pot (4) bottom, wherein:
   the self-watering system (1) includes at least one to the upper part (9) of the insert attached wick (11) for transporting fluid from the liquid container (2);
   the insert (3) is hollow and the diameter of the bottom of the insert is approximately equal to the inner diameter of the liquid container, and
   the upper part (9) insert (3) is tapered;
characterized in that the wick (11) extends along the exterior wall of the insert's (3) upper part (9) and lower part (7).

Also for these aspects there is provided a self-watering system (1) for a potted plant comprising a liquid container (2) with an integrated insert (3) with an in use position against the potted plant pointing upper part (9), which extends at least partially through an opening in the pot (4) bottom, characterized in that:
- the self-watering system (1) includes at least one to the upper part (9) of the insert attached wick (11) for transporting fluid from the liquid container (2);
- the insert (3) is hollow;
- the lower part of the insert (3) is adapted to the liquid container (2) so that the insert (3) is centered therein;
- the insert (3) extends from the bottom of the liquid container (2) and is tapered, and
- the wick (11) extends along the exterior wall of the insert's (3) upper part (9) and lower part (7).

In a fourth aspect according to the present invention there is provided a self-watering system of the aforementioned kind that can be used to water the plants placed in a tray (such as a transport-tray). Specifically there is provided a self-watering system for potted plants comprising a tray for receiving plant pots, wherein the tray is provided with one or more cavities that are adapted to the external form of the pots, said one or more cavities provided with inserts extending from the bottom of each cavity, said inserts each having an in use position against the potted plants pointing upper part (9), which extends at least partially through an opening in the pot bottom, characterized in that the self-watering system includes at least one to the upper part (9) of each insert attached wick (11) for transporting fluid from the cavities to the plant, said the wick (11) extends along the exterior wall of the insert's (3) upper part (9) and lower part (7).

The new and distinctive feature, which this is provided according to the present invention, is that the self-watering system includes at least one wick attached to the upper part of the insert for transporting liquid from the liquid container.

One so designed self-watering system can be simply and easily be adapted to potted plants with different liquid needs by simply selecting and adapting the wick parameters, such as number of wicks and location on the insert, the wick length, thickness, material, and other similar adjustable parameters by the at least one wick which ensures efficient supply of liquid to the specific plant in the specific type of pot. Much more liquid is evaporated from a clay flowerpot than from a plastic flowerpot, which can be taken into account by adjusting the aforementioned wick parameters.

The self-watering system according to the present invention is in contrast to known systems not critical to the choice of plant type, pot type, pot size, or type of growth medium, and all possible combinations of these can be easily added to water under optimum conditions. The self-watering system according to the present invention can either take the form of a plant pot or a tray that can be used to place a majority of pot plants.

The present invention therefore provides:
i) a self-watering system that takes the shape of a plant pot, namely a self-watering system for a potted plant comprising a liquid container and an insert with an in use position against the potted plant directing upper portion that extends at least partially through an opening in the pot bottom, characterized by that the self-watering system includes at least one wick attached to the upper part of the insert for transporting liquid from the liquid container, and that the insert has exterior upwardly directing distance elements.

ii) a self-watering system that takes the form of a tray, namely a self-watering system for potted plants placed in a potted plant tray, where the tray is provided with cavities that are adapted to the external form of the pots, which system comprises one or more inserts in the cavity bottom with an in use position against the potted plants directing upper portion that extends at least partially through an opening in the bottom of the pots, characterized in that the self-watering system includes at least one wick attached to the upper part of the insert for transporting liquid from the cavity bottom. This system may use the same characteristics as the system that takes shape as a plant pot.

The self-watering system according to the present invention is therefore flexible, easy to use, easy to adapt to individual needs while the self-watering system is cost saving.

It is preferred that the at least one wick is made of a textile, such as a polyester, which is capable of absorbing and transporting liquid via capillary effect, but any material having a capillary effect or is otherwise able to carry liquid from the liquid container to the growth medium in the pot, is applicable.

The upper part of the insert may advantageously include means for loosely holding the at least one wick, which means that it is possible to both add and remove wicks from the system as needed.

By simply changing one or more wick parameters, it is easy to fabricate self-watering systems that satisfy different individual needs, and to change these systems both before and after deployment. This means that if even one irrigation system is adapted to one specific liquid needs a kind of potted plant, and the system subsequently desired to use a different type of potted plant with a second liquid needs, or the first type of potted plant needs change, for example. as a result of increased growth or changing conditions for water evaporation, the system can be easily modified to fit the changing needs of the new instance by changing the wick parameters, such as removing or adding one or more wicks.

When the upper part of the insert is tapered so that the cross-sectional area of the insert decreases towards the pot, a single self-watering system according to the invention may be used in conjunction with flower pots with openings of various shapes and sizes.

The insert is equipped with external upwardly pointing distance elements so that the pot bottom during use is increased in proportion to the liquid level in the liquid container. Liquid supply to the growth medium can in this embodiment favorably be maintained using the at least one wick. Furthermore, the upwardly pointing distance elements in a simple way to ensure that there is a space for the least one wick between the pot bottom and the insert even when the cross-sectional area of the pot opening is as large as or larger in relation to the largest cross sectional area of the upper part of the insert.

A free end of the upwardly pointing distance elements may advantageously be circular in order to prevent the wick being trapped between an upwardly pointing distance element and the pot bottom, whereby the continuous liquid transportation consequently is interrupted.

Appropriately the insert may be hollow, so that minimum material is needed to manufacture it and material costs can thus be kept low. Moreover, hollow and identical base-less inserts be stacked on each other, rendering them easy to store and cheap to transport before use.

In order to allow water from the liquid container to fill the cavity in a hollow insert the lower part of the insert may include at least one liquid opening. This opening, which most appropriately is located along the edge of the insert that during use rests on the bottom of the liquid container, allows the liquid in the liquid container to freely pass into the insert cavities. Since only a tiny of the volume of the liquid container is occupied by the hollow insert, the volume of the container is therefore optimally used.

Compared to a self-watering system with a massive insert, the level of the insert may be reduced without compromising the liquid capacity liquid container, if the insert is hollow. If the insert is made hollow without changing its height, the advantage is that a larger volume of liquid, preferably water, may be stored in the liquid container which is not to be refilled as often as if the insert was massive.

When the upper part of the insert extends over a circular shoulder to a lower part with a larger diameter or with a larger cross sectional area than the maximum diameter of the upper part, respectively, largest cross-sectional area the insert may be stably placed in the bottom of the liquid container. This also allows the flowerpot to stay securely positioned in the self watering system. In a preferred embodiment the diameter or cross sectional areas of the insert's bottom is approximately equal to the inner diameter of the liquid or inner cross-sectional area of the liquid container, respectively.

Distance elements of the insert may favorably be located on the circular shoulder, for example, evenly distributed in a uniform pattern, such as a circle around the central axis of the insert, so as to achieve a particularly stable support of the flowerpot.

The resulting space between the pot bottom and the circular shoulder of the insert provides the advantage of at least one wick may be placed along the pot bottom and insert shoulder without the wick being clamped. Such clamping could lead to reduction or even cessation of the capillary effect of the wick that provides for transport of liquid from the liquid container to the pot. Alternatively, the wick may simply be cut in the clamping site.

The insert, according to the present invention can be designed as a body around a central axis, preferably a hollow body, whereby the insert is simple and inexpensive to manufacture, is dimensionally stable, can carry heavy pots without collapsing, and fits into most conventional liquid containers. A so constructed insert can be provided with a relatively thin circular wall without the insert's ability to support and carry flowerpots, even heavy flower pots, deteriorate.

Radial distance may be provided between the upper and outer surface and the perimeter of the pot opening, for example, by using shaped, radial distance elements, such as recesses, protrusions or similar structural components, which extends from the upper part's free end against the lower part. Alternatively, this radial distance may be a result of the design of the upper part. If, for example, the cross section of upper part is rectangular and the opening in the pot is circular, or vice versa, they leave, solely because of the different geometric shapes, throughgoing openings that allow the smallest wick free passage through the opening in the pot bottom without getting clamped between the aperture perimeter and upper part of the insert.

The means for loosely holding the at least one wick may for example be selected from the group consisting of a wedge, a pointed spear that can penetrate the wick, a track in the peak and a strap.

BRIEF DESCRIPTION OF THE DRAWINGS

The invention is described below in more detail with reference to the accompanying drawings, in which.

DETAILED DESCRIPTION OF THE INVENTION

Figure 1:
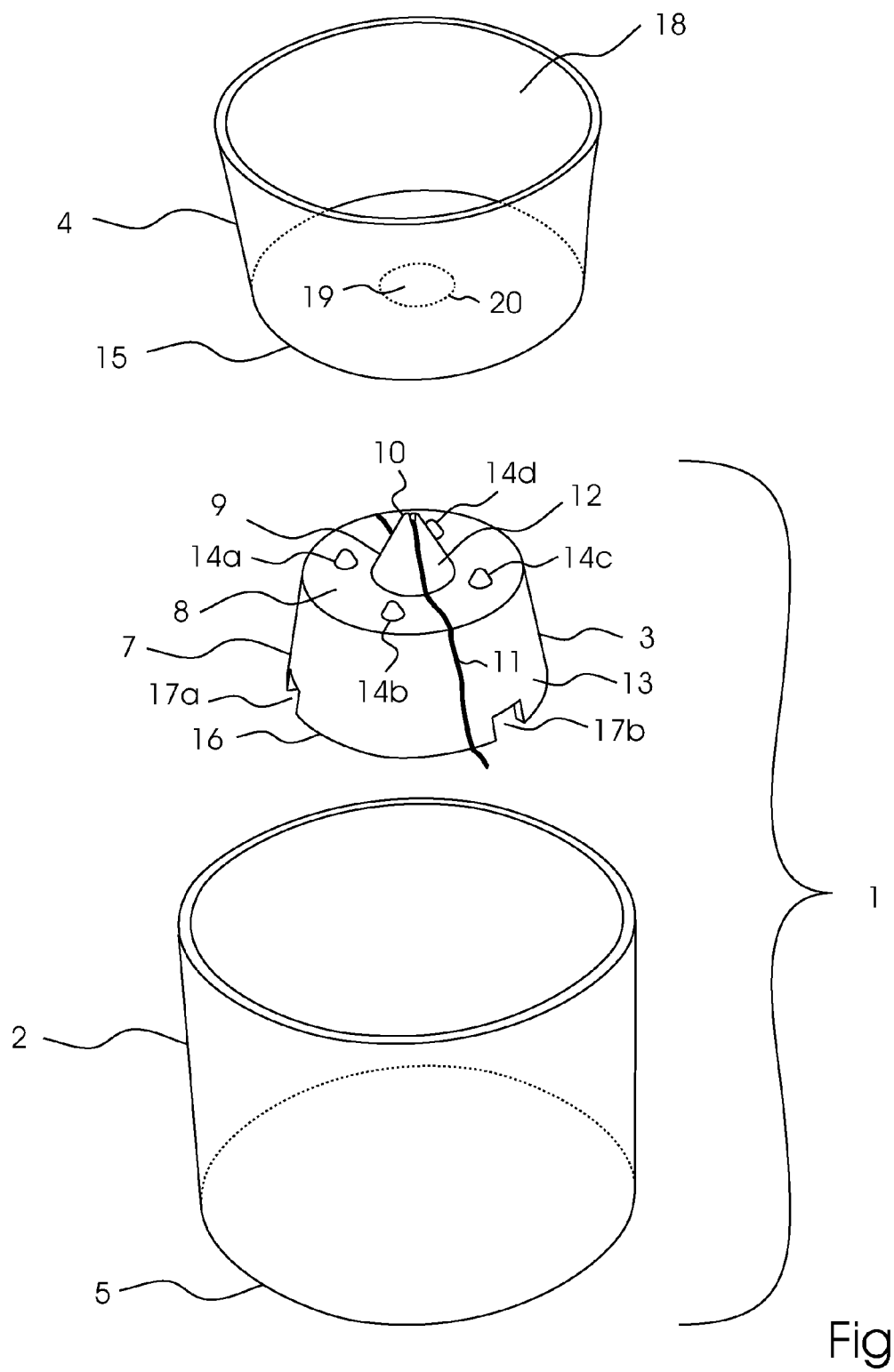
FIG. 1 shows a burst image seen in perspective of a first embodiment of the self-watering system for use with a flowerpot.

FIG. 1 shows, seen in perspective the components of the self-watering system according to the present invention. The individual components are shown as cylindrical bodies, but in principle the components can equally well be angular, such as polygon, etc.

Figure 2:
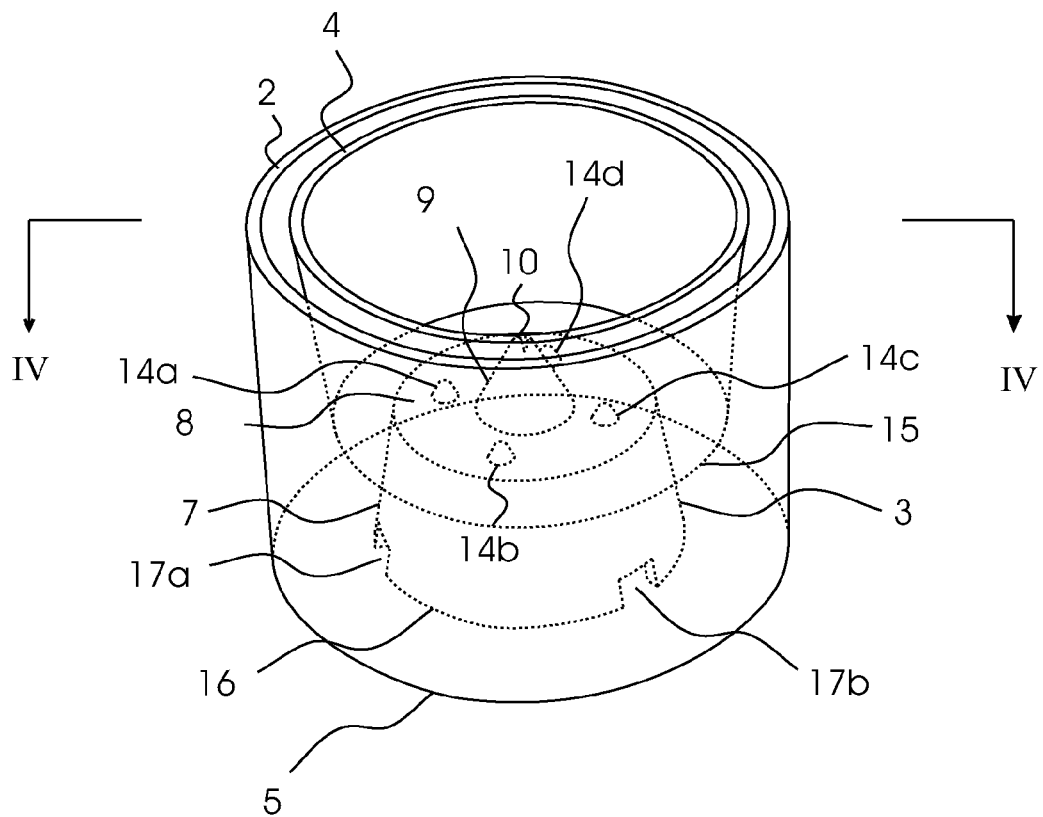
FIG. 2 shows the same in assembled state.

FIGS. 1 and 2 show a self-watering system 1 comprising a liquid container 2 and an insert 3 for use with a flowerpot 4. The liquid container 2 has a bottom 5 and an opposite open end 6, for receiving the insert 3. The insert has a lower part 7, which, via a circular shoulder 8 extends into a tapered upper part 9 with a wedge 10 to hold a wick 11. The wick 11 extends, in the case outlined along both the upper 9's circular wall 12 and the lower part 7's circular wall 13, where the wick 11 has a length that is sufficient to be immersed in a volume of liquid (not shown) in the liquid container 2 to obtain a capillary effect.

The circular shoulder 8 of the insert has a total of four against the upper part 9 upwardly pointing distance elements 14*a*, 14*b*, 14*c*, 14*d*, on which the flowerpot 4 bottom 15 rests, when placed in the use position. The lower portion 7 of the insert 3 has a free edge 16 with a continuous liquid opening 17*a*, 17*b* for liquid passage during use, when the insert 3 is located on the bottom 5 of the liquid container 2. The number of distance elements 14 and liquid openings 17 are shown as an example and more or fewer may be adopted within the scope of the present invention.

The actual pot 4 is a traditional flower pot with a bottom 15 and an open end 18 to receive a potted plant. The bottom 15 has a bottom opening 19 which is sufficiently large to be placed over the tapered upper part 9, while there is a gap between the perimeter 20 of the pot 4's bottom opening 19 and the upper part 9's circular outer wall 12 and a space between the pot 4's bottom 15 and the circular shoulder 8 so that the capillary effect can proceed completely unobstructed without constriction of the wick 11 as shown in the following FIG. 3, where the self-watering system 1 is assembled and planted with a potted plant.

Figure 3:
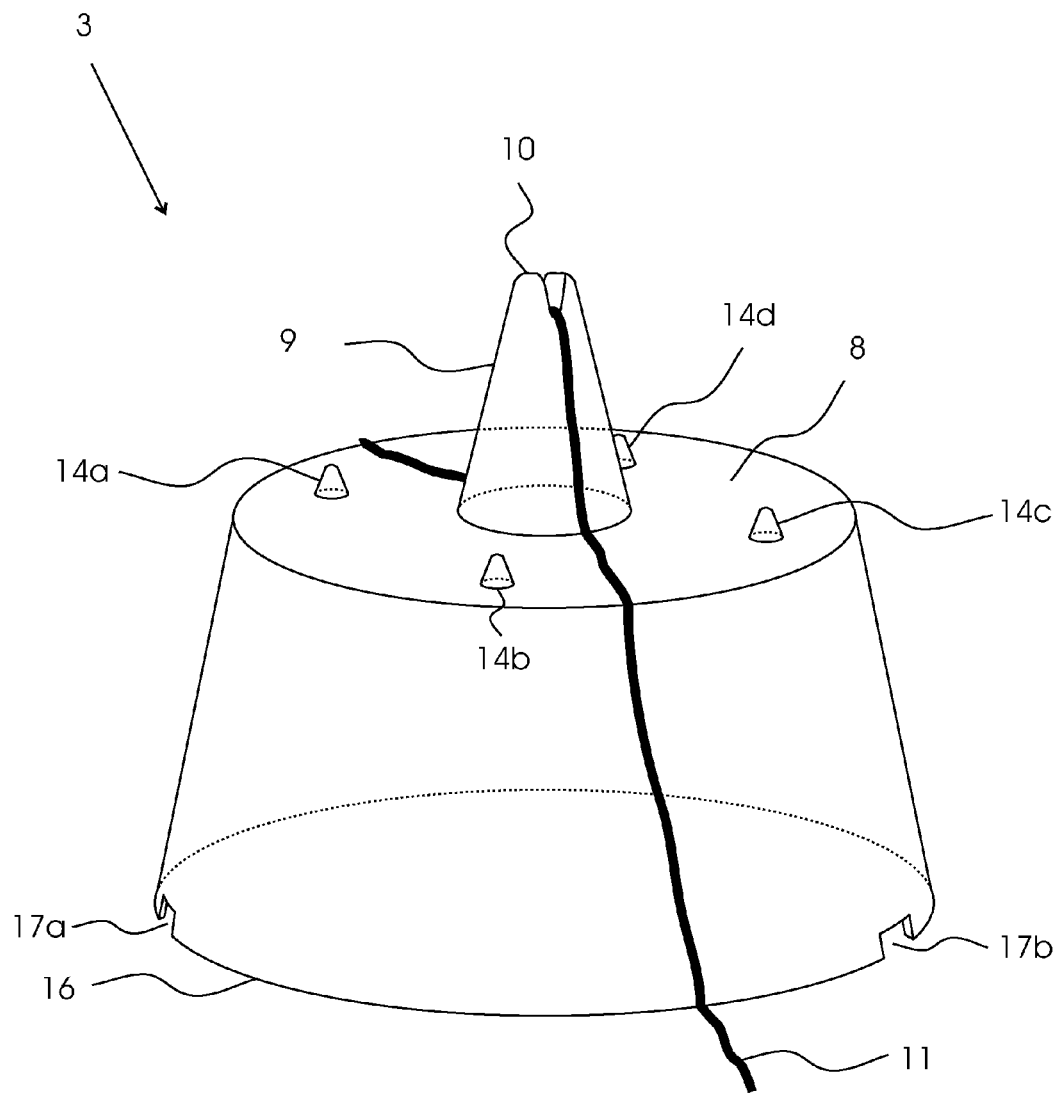
FIG. 3 shows, seen in perspective and larger scale, the insert shown in FIG. 1, FIG. 4 schematically shows a simplified cut along the line III-III in FIG. 2, on a larger scale and illustrated with growth medium and plant.

FIG. 3 shows the insert 3 from FIG. 1 in enlarged view, so that it is more clearly seen how the wick 11 is attached to the insert 3, where the mid region of the wick 11 is loosely held by the wedge 10, while the two ends of the wick 11 extend from the wedge 11 over the circular shoulder 8 and down to the bottom 16 of the insert 3.

Figure 4:
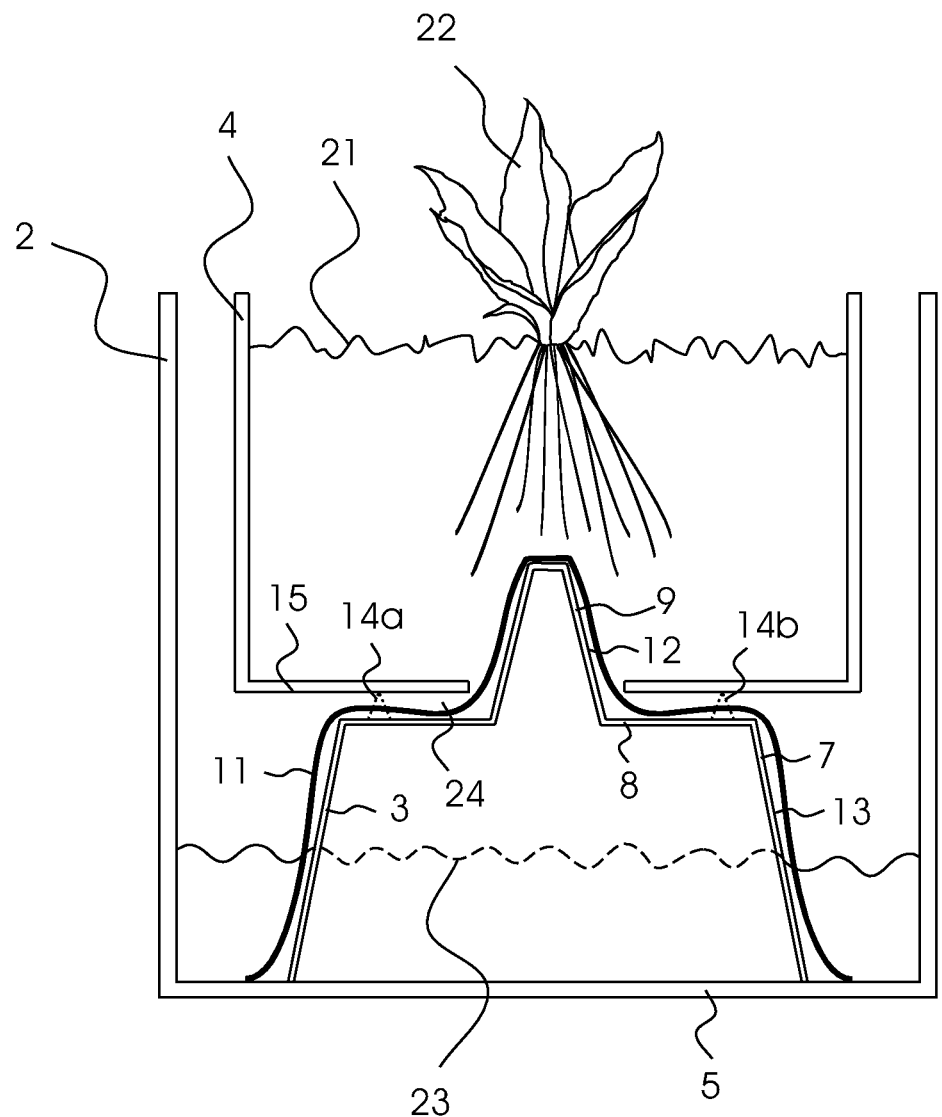

FIG. 4 shows the self-watering system 1 from FIG. 2 in a section through line IV-IV and with the addition of a growth medium 21, a plant 22 and liquid 23. The liquid 23 in the liquid container 2 only partially covers the lower part 7 of the insert so that liquid 23 does not have direct contact with the bottom 15 of the pot 4. FIG. 4 clearly show how the wick 11, which is loosely kept in the wedge 10, extends externally downwards the upper part's 9 outer wall 12 and further through the space between the circular shoulder 8 and the pot 4's bottom 15 and along the lower part 7's external wall 13 towards the bottom 5 of the liquid container 2, so that the wick 11 can transport liquid 23 to the growth medium 21 in the pot 4. Since the cut through the line IV-IV in FIG. 2 is along the wedge 10, the wedge is not seen in FIG. 4. Since the section also passes through the wick 11, the upwardly pointing distance elements 14a, 14b are not part of the cut, but still included in FIG. 4 to clarify how they ensure that there is a gap 24 between the circular shoulder 8 and the pot's 4 bottom 15, since the bottom 15 rests on the distance elements 14a, 14b.

Figure 5:
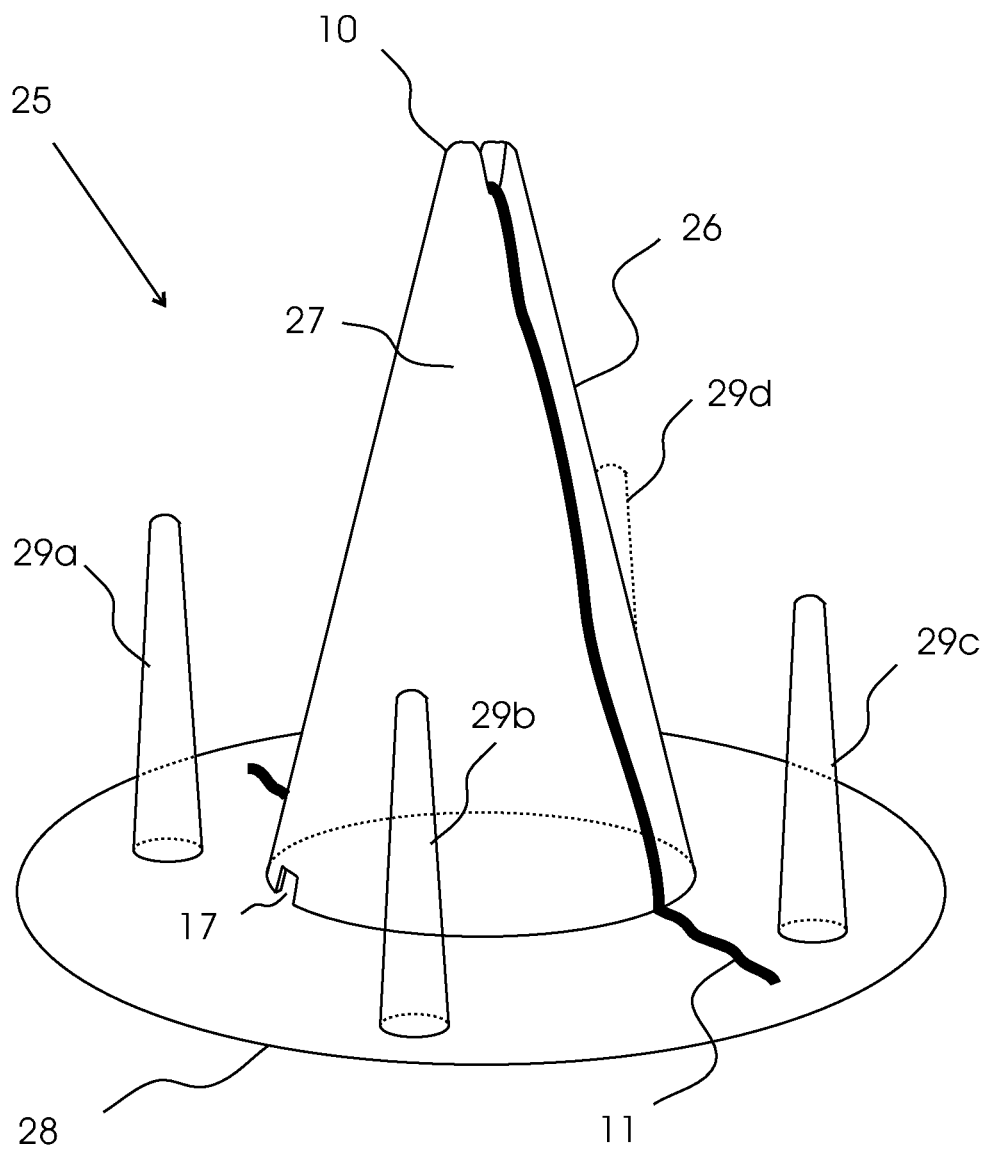
FIG. 5 shows, seen in perspective, another embodiment of an insert according to the invention.

FIG. 5 shows an alternative embodiment of the insert 25 according to the invention in which the wick 11 extends from the wedge 10 and extends externally along the upper 26's outer wall 27 and along the base 28. In the use position with liquid container 2 (not shown) and a pot 4 (not shown) the base 28 stands on the bottom 15 of the liquid container 2 so that the wick 11 can transport liquid 23 (not shown) from the bottom 15. The upwardly pointing distance elements 29a, 29b, 29c, 29d has a sufficient height so that when a flowerpot 4 (not shown) during operation rests on the upwardly pointing distance elements 29a, 29b, 29c, 29d, there is room for enough liquid 23 (not shown) in the liquid container 2 without the liquid 23 is in contact with the pot 4's bottom 15, while the tapered end of the insert 25's upper portion 26 extends partially into the inner of the pot 4 in the same way as the embodiment shown in FIG. 1-4. At the base 28 the insert 25 has a liquid opening 17 with the same function as the embodiment shown in FIG. 1-4.

Figure 6:
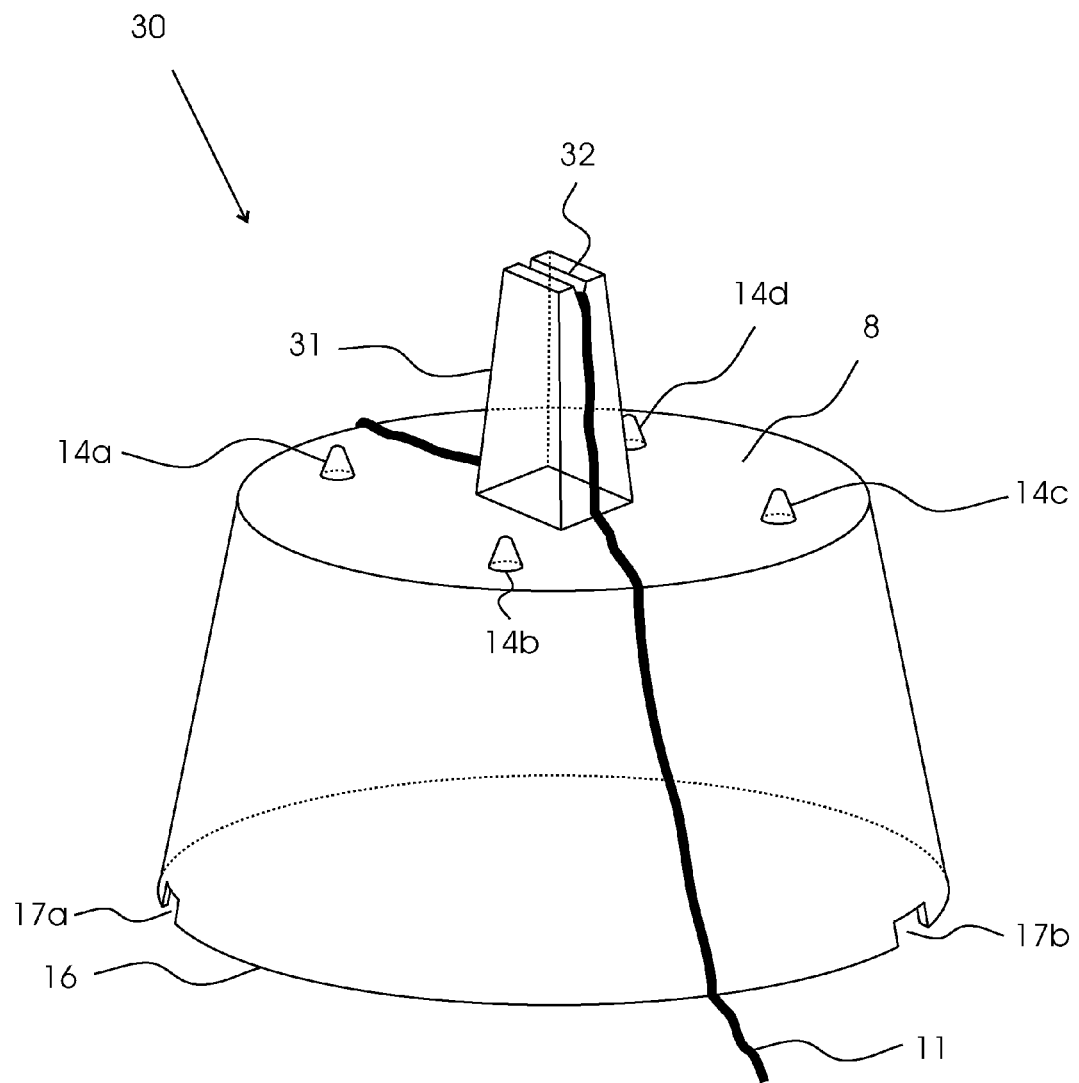
FIG. 6 shows, seen in perspective, a third embodiment of an insert according to the invention.

FIG. 6 shows yet another alternative embodiment of the insert 30 according to the invention, where the difference in comparison with the insert 3 in FIG. 1-4 is that the insert's 30 upper part 31 is designed as a pyramid stump with one at the top designed wedge 32 to loosely retain the wick 11. This design of the upper part 31 is particularly advantageous for use with flower pots with circular openings in their bottom, as previously mentioned.

Figure 7:
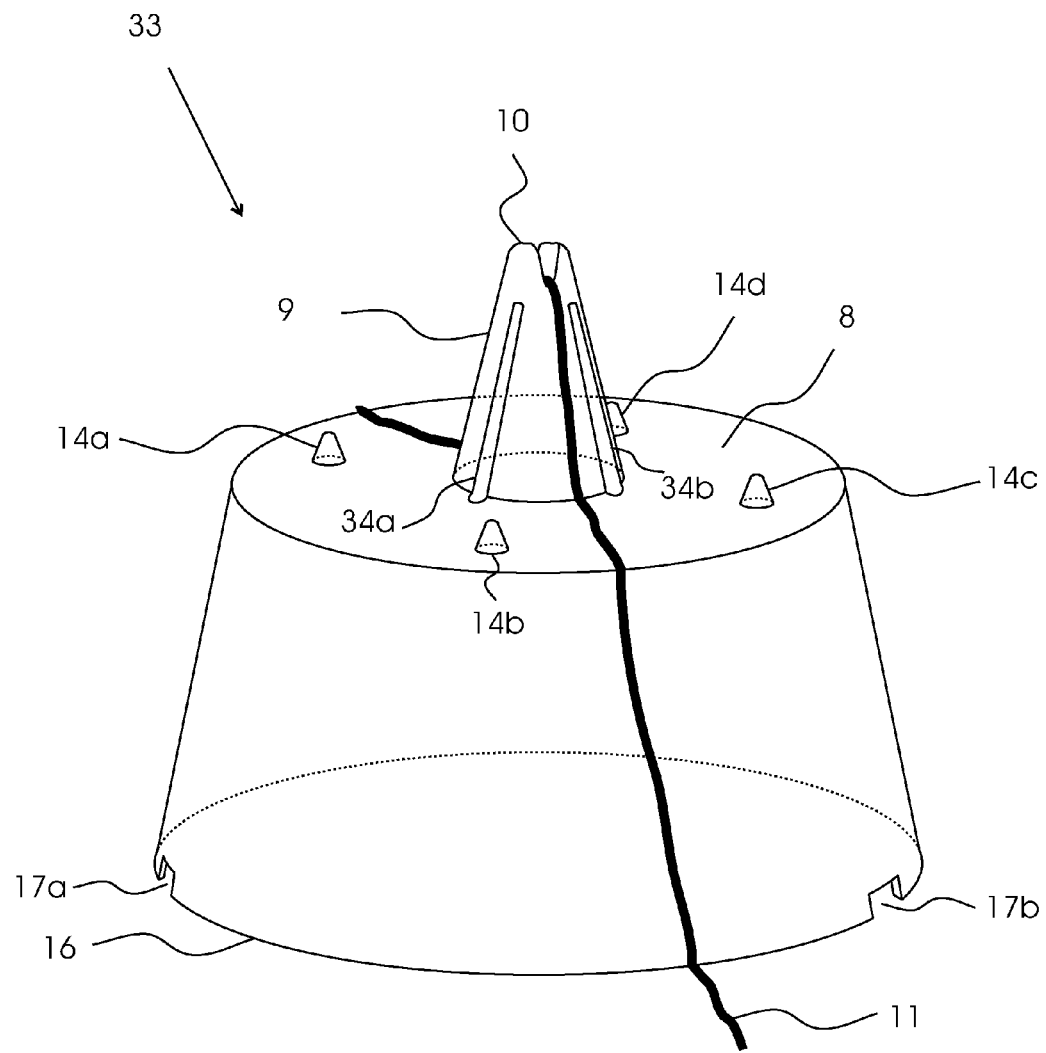
FIG. 7 shows, seen in perspective, a fourth embodiment of an insert according to the invention.

FIG. 7 shows a further alternative embodiment of the insert 33 according to the invention, where the difference in comparison with 3 in FIG. 1-4 is that the insert 33 is designed with a number of radial distance elements (FIG. 7 shows two radial distance elements 34a, 34b), which most preferably are symmetrical about the insert 33's central axis. The means for loosely holding the at least one wick may be provided by supplying the top of the upper part with a top notch/wedge or e.g. two essentially perpendicular serrations/wedges.

Figure 8:
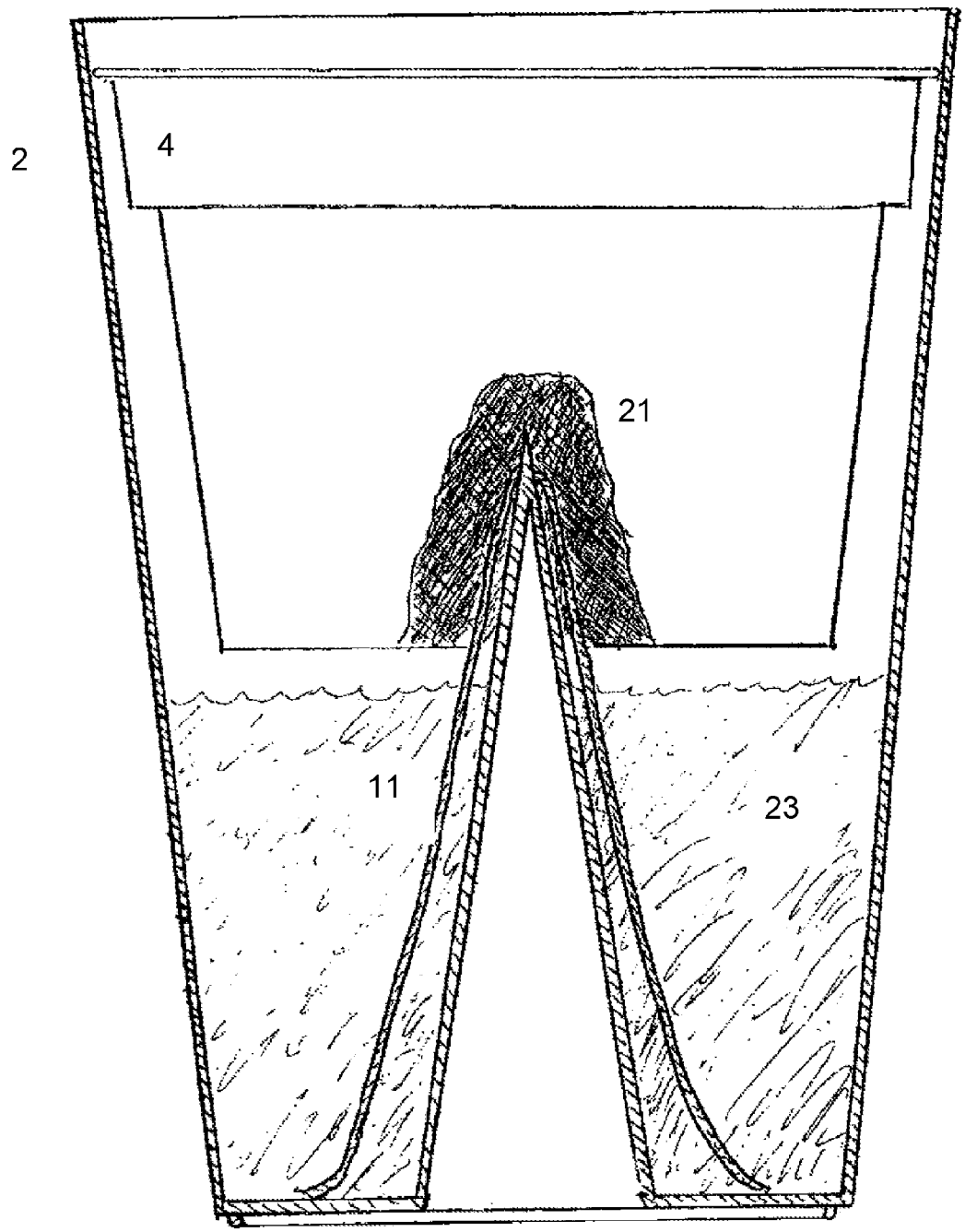
FIG. 8 shows, seen in cross section a fifth embodiment where the liquid container and the insert are integrated.

FIG. 8 shows an embodiment of the present invention, wherein the liquid container and the insert are integrated. The liquid container is integrated with the insert (here a hollow mandrel) in its center. The insert is fitted with a wick 11 in the top. Means for holding the wick 11 may be a wedge to into which the wick may be clamped. The liquid container is filled with water 23, after which the pot 4 is put into the container, thus pressing the top of the insert (here mandrel) into the center hole of the pot so that the wick 11 comes into contact with potting 21. The wick can transport water up from the liquid container, whereby the potting soil absorbs the water transported by the wick (due to capillary effect), where the water is distributed mainly in the lower ⅔ parts of potting soil, in which most plant roots are located.

The insert may within the scope of the present invention have a height that is less than the height of the liquid container, so that the insert and the at least one wick is not visible. For example, the internal height of the liquid container may be adjusted so that it is essentially equals the pot height when the pot is placed in the self-watering system of the present invention, whereby the liquid container acts as a plant pot that may have an outer surface that is particularly decorative. Furthermore it achieves the advantage that less liquid evaporates from the liquid container when the air circulation around the liquid in the liquid container is reduced.

Figure 9:
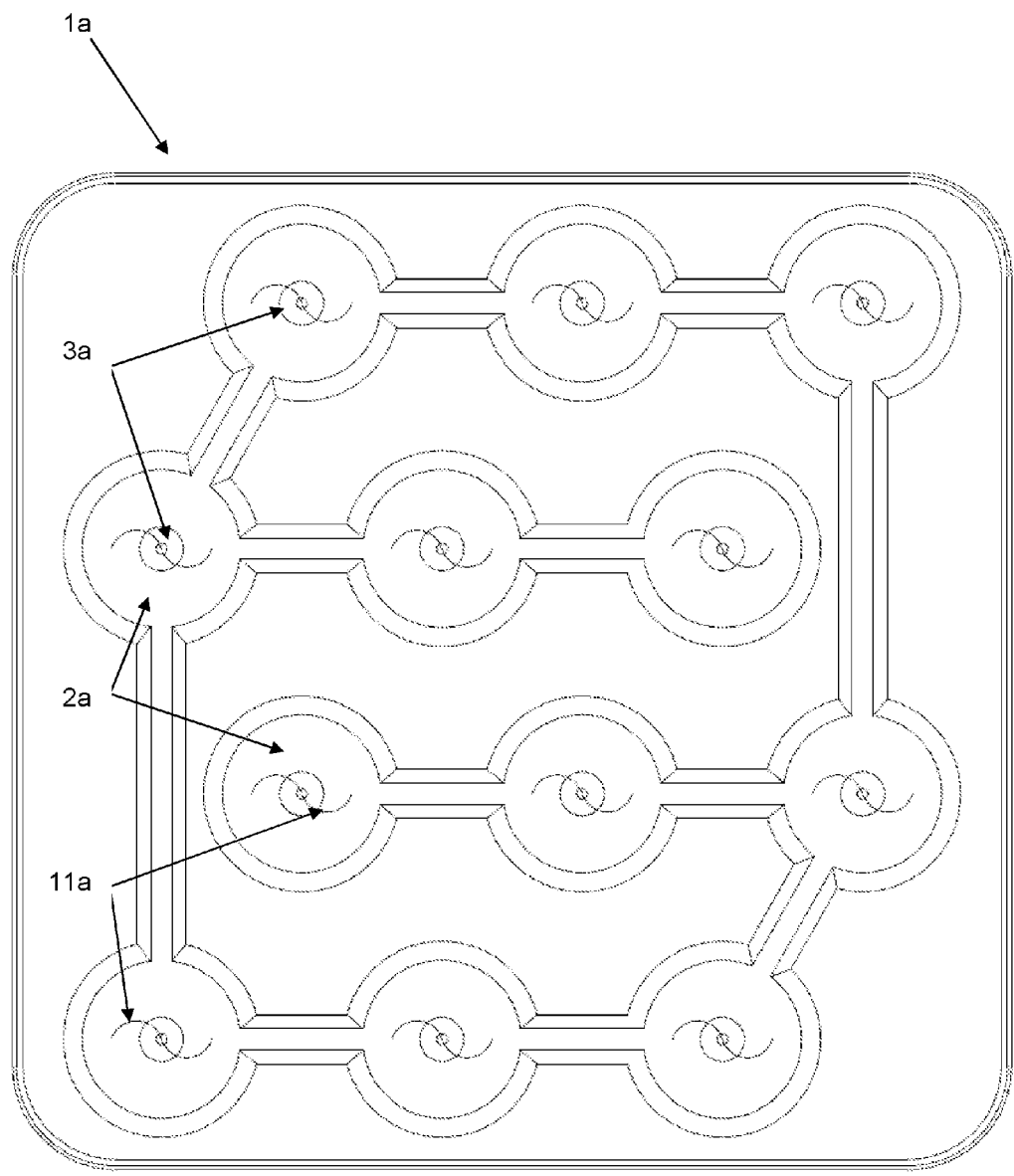
FIG. 9 shows, seen at the top, a tray according to present invention for self-watering of pot plants.

FIG. 9 shows, seen at the top, a tray-based self-watering system 1a according to the present invention for self-watering pot plants, wherein cavities/liquid containers 2a are provided with inserts 3a each having a wick 11a for use with a flowerpot 4a (not shown). Hence, in this embodiment the principles of the present invention are extended to commonly used flower trays as an alternative to the flower pots normally used.

Figure 10:
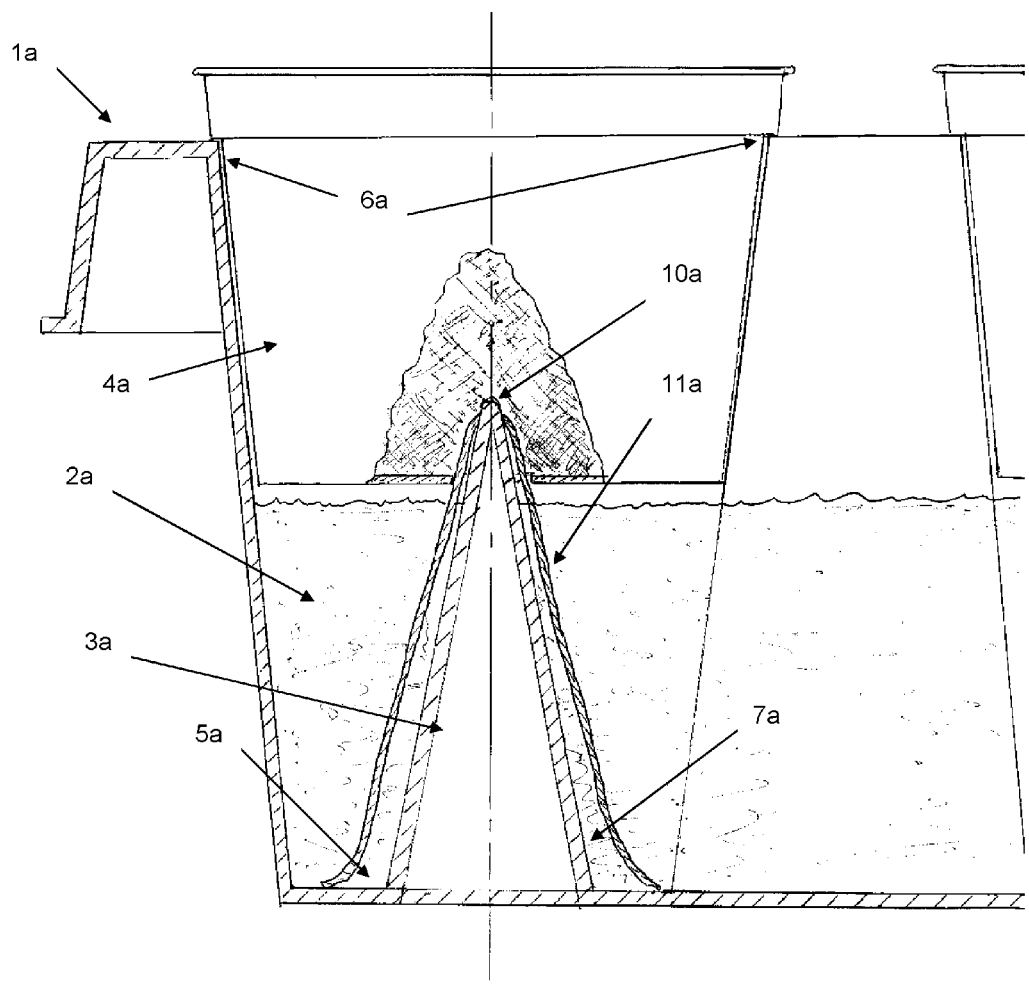
FIG. 10 shows, seen in cross section, a tray according to present invention for self-watering of pot plants.

FIG. 10 shows, seen in cross section, a section of the tray-based self-watering system 1a in FIG. 9 with cavities/liquid containers 2a and inserts 3a for use with a flowerpot 4a. Each liquid container 2a has a bottom 5a and an opposing open end 6a to receive an insert 3a. The inserts have a lower part 7a which extends into a tapered upper part with a wedge 10a to maintain a wick 11a. The wick 11 extends, in the case outlined along both the upper part's circular external wall and the lower part 7a's circular external wall, where wick 11a has a length that is sufficient to be immersed in a volume of liquid in liquid container 2a to obtain a capillary effect.

In a preferred embodiment the lower part of the wick is adapted the liquid container so that the insert is centered therein. In practice this means that a pot with a center hole can be inserted in a simple workflow whilst inserts (including wick) are mounted into the pot. This is done without positioning/adjustment of the insert relative to the pot.

Direct contact between the growth medium and the liquid in the liquid container can cause the growth medium to absorb too much water or the growth medium to collapse, both with negative consequences for the plant. It is therefore important in the present invention that the lower part of the insert has a height adapted to the volume of liquid required in a given application with the self-watering system so that said direct contact is avoided.

The insert may also be designed from a material that is dimensionally stable and resistant to external influences, such as plant fertilizer and similar chemicals. Suitable materials for the wick include but are not limited to, for example polypropylene that is inexpensive and easily machined. If the insert is designed for multiple use, for example a transparent decorative water container made of glass, the wick may be made from glass, ceramic or metal. Especially a hollow insert may be designed by a dimensionally stable material.

The preferred number of wicks can be between 1 and 10, more preferred between 1 and 7 and especially preferred between 1 and 4.

The capillary effect of the at least one wick works particularly effectively if the wick is made of, for example, polyamide, or other suitable synthetic/natural fabric.

To ensure that the at least one wick is directed from the retention point on the upper part of the insert and essentially perpendicular to the liquid container bottom, the outer surface of the insert may be fitted with one or more gripping means which grips the wick and thus keeps it essentially outstretched. These measures will prevent that at least one wick trapped between the pot and the upwardly pointing distance elements or between the pot and the radial distance elements, which for example could occur if the at least one wick stretched diagonally along the insert's exterior wall due to the handling of the insert and flowerpot. These means, such as hooks, may for example be located on the circular shoulder at the base of the upper part and/or at the base of the lower part.

The insert is designed with an upper portion and a base, as illustrated in FIG. 5. In the use position the base may with advantage rest directly on the bottom of liquid container and the base may have an area which essentially corresponds to the internal area of the liquid container bottom so that the base rests stable.

Liquid is either filled into the container before the insert and the pot are put into the liquid container or subsequently through the space between the upper edge of the liquid container and the upper edge of the flowerpot.

The invention claimed is:

1. Self-watering system for a potted plant comprising a liquid container and an insert, the insert includes an upper part constructed to extend at least partially through an opening in a pot bottom, and a lower part wherein:
   the insert includes at least one wick for transporting fluid from the liquid container to the upper part;
   the insert is hollow and the lower part has a bottom diameter selected so that the lower part of the insert is adapted to the liquid container so that the insert is centered in the liquid container; and
   the upper part of the insert is tapered;
   wherein the wick extends along an exterior wall of the upper part and the lower part of the insert; and
   wherein the lower part of the insert includes at least one fluid opening.

2. Self-watering system according to claim 1, wherein the upper part of the insert includes means for loosely holding the at least one wick.

3. Self-watering system according to claim 2, wherein the means for loosely holding the at least one wick is selected from the group consisting of a wedge, a pointed spear that can penetrate a wall, a track, and a strap.

4. Self-watering system according to claim 1, wherein the insert includes exterior upwardly pointing distance elements.

5. Self-watering system according claim 4, wherein the upper part of the insert extends through a circular shoulder of the insert into the lower part of the insert, wherein the lower part has a larger diameter or larger sectional area than a maximum diameter or largest cross-sectional area the upper part.

6. Self-watering system according to claim 5, wherein the upwardly pointing distance elements are located on the circular shoulder.

7. Self-watering system according to claim 1, wherein the bottom diameter is equal to an inner diameter of the liquid container.

8. Self-watering system for a potted plant comprising a liquid container with an integrated insert which extends at least partially through an opening in a pot bottom, wherein:
   the insert includes at least one wick for transporting fluid from the liquid container;
   the insert is hollow and includes an upper part and a lower part;
   the insert includes a lower part adapted to the liquid container so that the insert is centered in the liquid container;
   the insert extends from a bottom of the liquid container and is tapered;
   the wick extends along an exterior wall of the upper part and the lower part of the insert; and
   wherein the lower part of the insert includes at least one fluid opening.

9. Self-watering system according to claim 8, wherein the insert takes the form of a mandrel.

* * * * *